United States Patent
Stunkard

[15] 3,650,514
[45] Mar. 21, 1972

[54] SELF CENTERING PIPE WORKING MACHINE

[72] Inventor: Gerald A. Stunkard, P.O. Box 594, Jenks, Okla. 74037

[22] Filed: Nov. 7, 1969

[21] Appl. No.: 874,758

[52] U.S. Cl. ..................................266/23, 82/4 C, 408/105, 408/126
[51] Int. Cl............................................................B23k 7/04
[58] Field of Search.................266/23 N, 23 NN; 82/4 C, 46; 77/73, 29; 74/215; 408/105, 126

[56] References Cited

UNITED STATES PATENTS 2,097,071 10/1937 Lichten....................................74/215
2,747,274 5/1956 Willard et al.............................82/4 C Primary Examiner—Leonidas Vlachos
Attorney—Robert E. Massa

[57] ABSTRACT

A self centering pipe-working machine has a circular frame portion positionable around a pipe section, an openable ring assembly in movable contact with the periphery of the frame portion, two pairs of clamping members attached to the frame portion on a first side thereof, and two pairs of clamping members attached to the frame portion on a second side thereof. Each of the first mentioned two pairs of clamping members are operably interconnected through universal joint means, and each pair of clamping members on the second side of the frame portion are operably connected to a corresponding pair of clamping members on the first side of the frame portion. Threaded means connects each pair of the first mentioned two pairs of clamping members to the universal joint means to provide the combined clamping and self centering adjustments. The other two pairs of clamping members on the other side of the frame correspond in unison to the first two pairs. Adjustable tool support means is removably attached to the openable ring member for rotative movement around a pipe section to be worked. In one embodiment, driving means is attached to the frame with the driving means having a driven wheel in contact with the rotatable ring assembly in order to rotate the tool support means around the pipe section. In another embodiment of the invention, the driving means includes a driven sprocket member in contact with a chain-like member secured to the periphery of the openable ring assembly in order to drive the ring assembly.

17 Claims, 7 Drawing Figures

Patented March 21, 1972

INVENTOR.
GERALD A. STUNKARD

BY

*Robert C. Massa*

ATTORNEY

INVENTOR.
GERALD A. STUNKARD
BY
ATTORNEY

Patented March 21, 1972

INVENTOR.
GERALD A. STUNKARD

BY Robert C. Mason

ATTORNEY

SELF CENTERING PIPE WORKING MACHINE

BACKGROUND OF THE INVENTION

This invention relates to pipe-working machines. More particularly, this invention relates to self centering pipe working machines, and still more particularly, to self centering pipe-working machines usable for a variety of pipe-working operations, such as cutting, beveling, welding, grinding, drilling, or x-raying.

Quite commonly, during pipe line operations, a pipe section must be "worked." That is, the pipe section must be cut to a desired length, or the end of a pipe section must be beveled to prepare it for a following welding operation, or the end of the pipe section must be specially treated as by grinding for some other special purpose. Pipe sections are usually provided in lengths of 40 feet and in diameters to 48 inches or more depending upon the type of service to which the pipe will be subjected. Because of the cumbersome size of the pipe section, and because it cannot be ascertained in advance what operation must be provided for each adjacent pipe section, the pipe-working operations are generally carried on near the site where the pipe will be used. Therefore, it is desirable to have a pipe-working apparatus which could be made portable and usable for either field or yard work, and which can be readily adaptable to the particular operation desired to effect considerable saving in time and labor.

A primary object of this invention is to provide a pipe-working machine which is efficient in operation, easy to use, and inexpensive to manufacture.

Another object of this invention is to provide a pipe-working apparatus which is readily adaptable to various sizes of pipe.

Still another object of this invention is to provide a pipe-working apparatus which is capable of performing a multiplicity of operations.

Another object of this invention is to provide a self-centering pipe-working machine which is accurately positionable on a pipe.

Another object of this invention is to provide a self-centering pipe-working machine which may be easily and quickly positioned on a pipe.

Still another object of this invention is to provide a self-centering pipe-working machine which may be easily, quickly, and accurately positioned on a pipe section.

Still another object of this invention is to provide a pipe-working machine which may be accurately and efficiently positioned on a pipe section and which is adaptable to receive various sizes of pipe.

Still another object of this invention is to provide a self-centering pipe-working machine adaptable to support a working tool for peripheral movement around a pipe.

Still another object of this invention is to provide a self-centering pipe-working machine which is adaptable for either manual or powered movement of a pipe-working tool peripherally around a pipe.

BRIEF DESCRIPTION OF THE DRAWINGS

Further objects and advantages of the invention will become apparent from the following description and claims and from the accompanying drawings wherein:

FIG. 4 is a side elevational view of an alternate embodiment of a pipe-working machine according to this invention similar to FIG. 1.

FIG. 7 is a sectional view along the lines 7—7 of FIG. 1.

DESCRIPTION OF THE PREFERRED EMBODIMENTS

A self-centering pipe-working machine according to this invention comprises a circular frame, an openable ring assembly rotatable on the circular frame, self-centering clamp means attached to the circular frame and clampable to a pipe section to be worked, the clamp means including a pair of clamp members operably connected through a universal joint, tool support means connected to the ring assembly, and means for rotating the ring assembly on the frame.

An important feature of this invention is the capability of the clamp means to center the device accurately as the clamping members engage the surface of a pipe section so that the working tool, which may be a cutting torch, grinding or polishing member, or other desired tool, will be accurately positioned in relation to the portion of the pipe to be worked for orbital travel around the pipe. The clamping and centering operations of this machine are therefore easily and quickly accomplished.

Another important feature of this pipe working machine is the provision of an openable ring assembly in conjunction with the self-centering capabilities of the clamp means.

The importance of these features can be best understood by reference to other devices which are known in the art. U.S. Pat. No. 2,146,959 to Kugel, issued Feb. 14, 1939, describes a pipe cutter which includes a plurality of pipe-gripping members which position the pipe concentrically in relation to a central opening of the device. However, as stated by the patentee, the device is put into operation by being slipped over the end of the pipe and moved along to the point at which the operation is to take place, since the device is not adaptable to being opened for quick positioning directly around the position where the operation is to take place.

U.S. Pat. No. 2,086,764 to Brown, issued July 13, 1937, U.S. Pat. No. 2,364,963 to Elliott, issued Dec. 12, 1944, and U.S. Pat. No. 2,687,880 to Waterson, issued Aug. 31, 1954, each describe related apparatus having an openable ring assembly permitting the ring assembly to be positioned around a portion of a pipe section for carrying a working device around the periphery of the pipe section. However, in each of these cases, the ring assembly, and therefore the working device, is not self-centering. In each of the foregoing instances, the means to adjust the ring assembly concentrically with regard to the pipe section is independently adjustable from the means to secure the apparatus to the pipe section.

Figure 1:
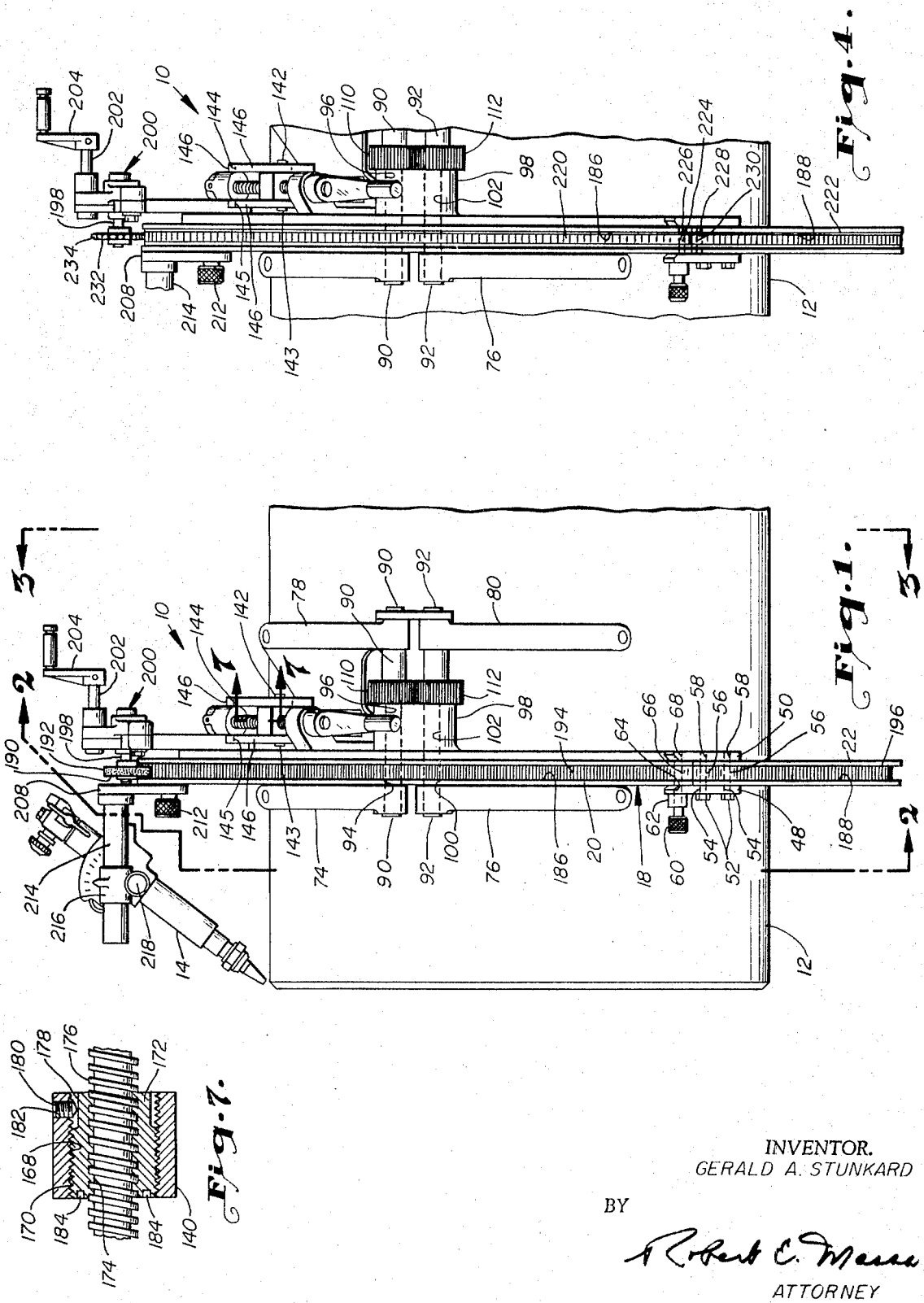
FIG. 1 is a side elevational view of a pipe-working machine according to this invention.

Referring now to the drawings in detail, FIG. 1 describes a pipe-working device 10, generally, according to this invention, is position upon a section of pipe 12 as it would be in holding a working tool in position such as a cutting torch 14. Cutting torch 14 could be maintained in proper position for rotatable movement around the periphery of pipe section 12 for cutting a section of pipe to a desired length or for preparing a beveled edge on the pipe section, of for presenting a smooth edge for the pipe section. Cutting torch 14 is shown in position for example only, and it is understood that other working tools may be so held in position, as for example a grinding tool, a drilling tool, or some other special tool adaptable for rotatable movement around the periphery of a pipe section. The pipe-working device includes a frame member 16 (shown more clearly in FIGS. 2 and 3), essentially circular in conformation and comprising a portion of a circle, and a two-component openable ring member 18, generally, comprised of first ring portion 20 and second ring portion 22. Frame member 16 includes an annular groove 24 as shown in FIG. 5, and ring member 20 includes a tongue portion 26 adapted to move slidably and circumferentially in groove 24. Second ring portion 22 includes a tongue portion 28 which acts as a continuation of tongue 26 to move slidably in groove 24 as the openable ring 18 rotates around frame member 16 during operation of the device. Ring members 20 and 22 can be machined accurately so that they will abut each other precisely permitting tongue portions 26 and 28 to operate smoothly in groove 24.

FIG. 6 describes in detail how second ring portion 22 is hinged to first ring portion 20 by means of pin 30 positioned in bushing 32 which is placed in opening 34 in first ring portion 20, and hinge plates 36 and 38 which are secured to second ring portion 22 by means of machine bolts 40 which pass through openings 42 in hinge plate 36 and openings 44 in ring member 22, and are received threadably in threaded portions 46 of hinge plate 38. Second ring portion 22 is received lockably in position against first ring portion 20 by means of a locking device formed by plate members 48 and 50, machine bolts 52 which pass through openings 54 in plate member 48 and openings 56 in ring member 22 and are received threadably in openings 58 in plate member 50, any by operation of a threaded bolt member 60 which has a threaded portion received in interior threads of a nut member 62 fastened on plate 48, and which passes through opening 64 in plate 48 and opening 66 in ring member 20 and which is received threadably in opening 68 in plate member 50. Thus, with ring member 22 in position abutting ring member 20, bolt member 60 can be threaded into position to secure the alignment of ring members 20 and 22. However, bolt member 60 can take a variety of arrangements, instead of being received threadably in opening 68, bolt member 60 could just as well pass through opening 68 and be received by a separate machine nut threadable thereon, or bolt member 60 may be in the form of a pin member which is spring biased through openings 64, 66, and 68. Release of bolt member 60 from its locking position thus permits ring portion 22 to swing open on its hinge portion in order to permit the entire ring assembly 18 to be positioned around a pipe section for clamping of the pipe-working device thereon.

Figure 2:
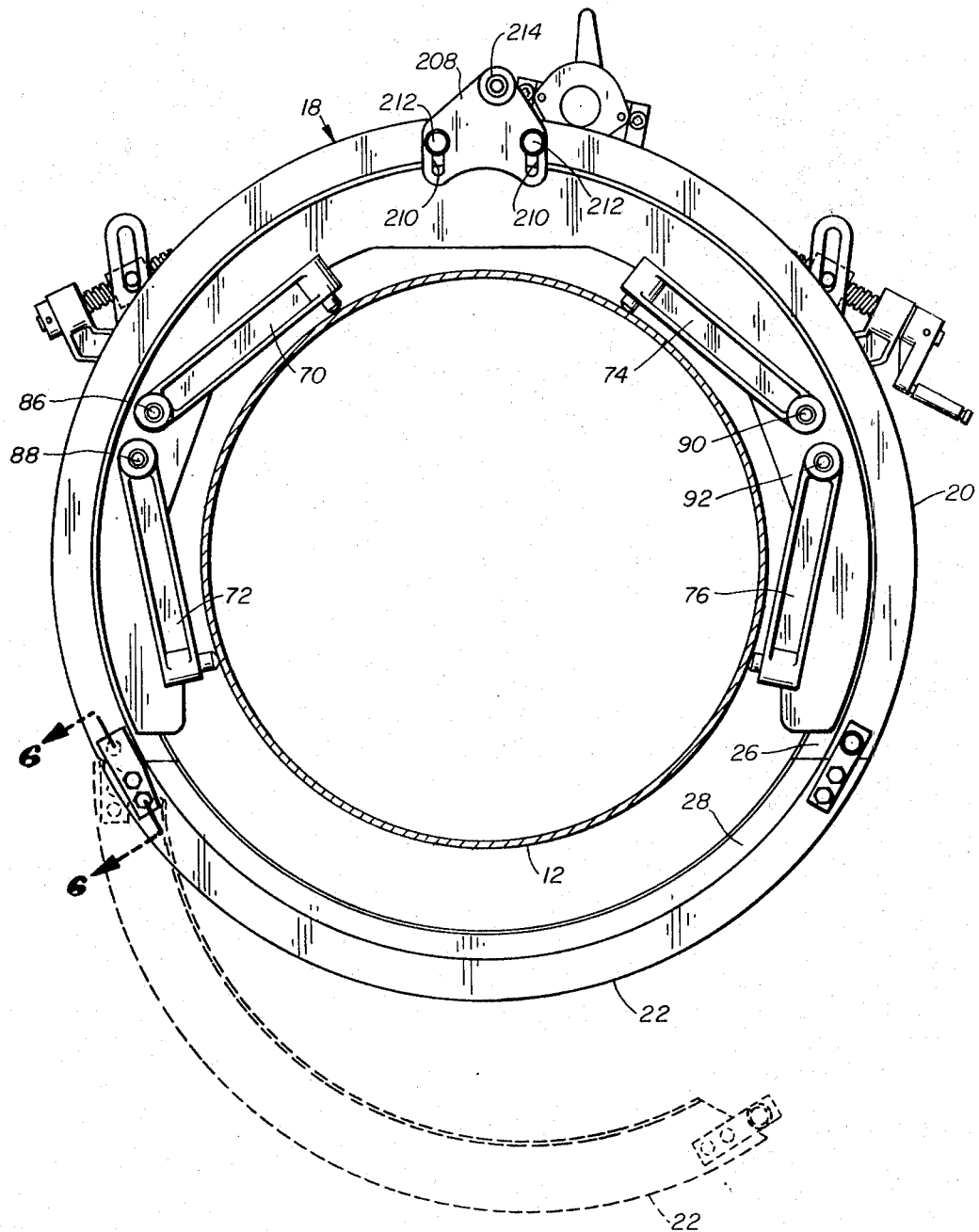
FIG. 2 is a front elevational view of a pipe-working machine according to this invention along the lines 2—2 of FIG. 1.
Figures 3, 5, 6:
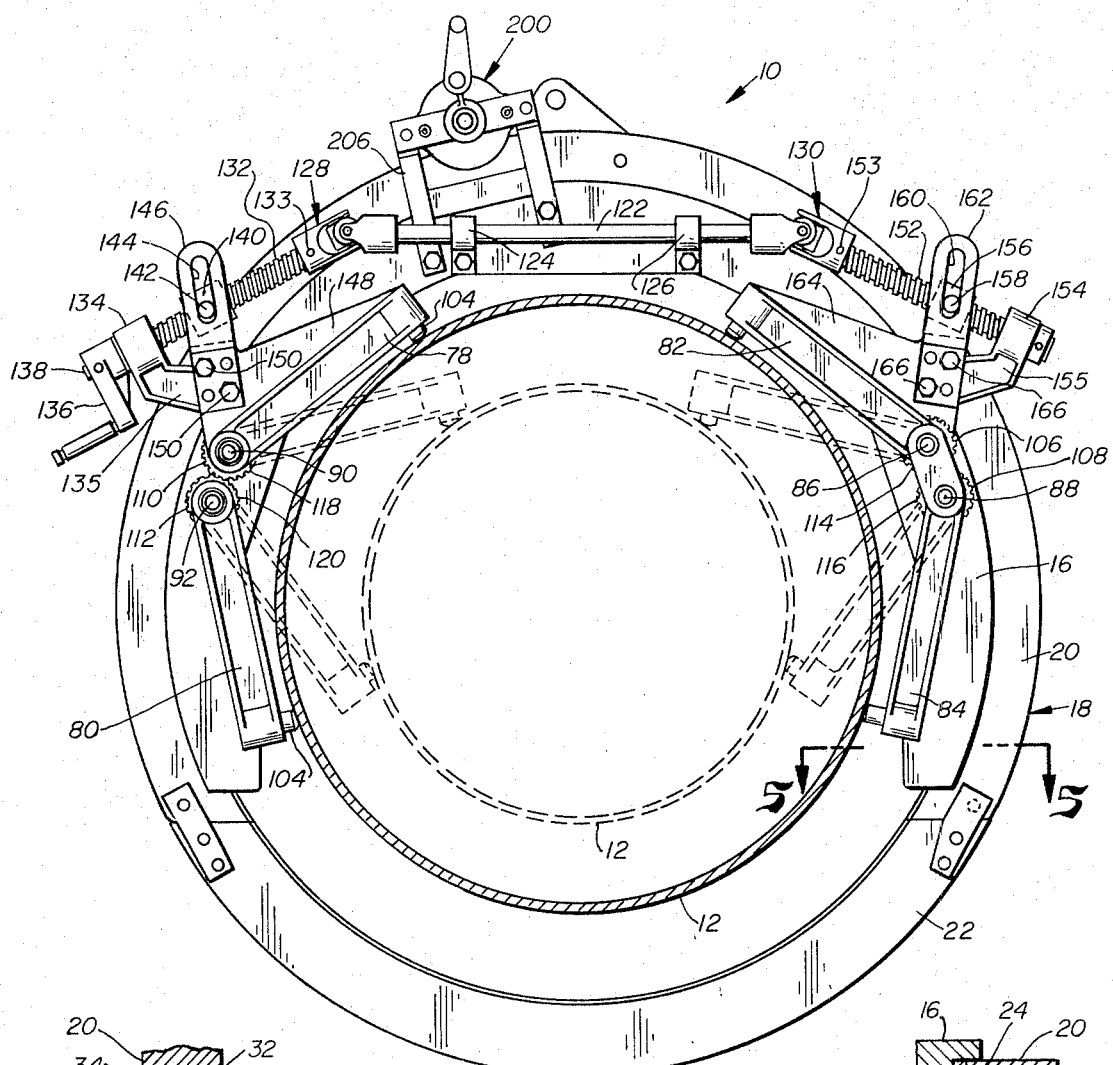
FIG. 3 is a rear elevational view of a pipe-working machine according to this invention along the lines 3—3 of FIG. 1.
FIG. 5 is a sectional view along the lines 5—5 of FIG. 3.
FIG. 6 is a sectional view along the lines 6—6 of FIG. 2.

As shown most clearly in FIGS. 2 and 3, there are a plurality of clamping arms 70, 72, 74, 76, 78, 80, 82, and 84. Clamping arms 70 and 82 are positioned on shaft 86, clamping arms 72 and 84 are positioned on shaft 88, clamping arms 74 and 78 are positioned on shaft 90, and clamping arms 76 and 80 are positioned on shaft 92. Thus, clamping arms positioned on the same shaft are capable of moving in unison as the shaft rotates. As shown in shadow in FIG. 1, shaft 90 is positioned rotatably in a bore 94 in frame member 16 which is coaxial with a bore 96 in journal 98 which is integral with frame member 16. Shaft 92 is similarly received rotatably in bore 100 of frame member 16 and bore 102 in journal 98. Likewise, shafts 86 and 88 are received rotatably in a similar bore through frame member 16 (not shown) and a bore through a similar journal member (not shown). Each of the clamping arms includes a hardened tip 104 which may, if desired, be made adjustable in any suitable manner so that each arm may contact a pipe section simultaneously. Integral with each shaft 86, 88, 90, and 92, is an enlarged radial portion 106, 108, 110, and 112, respectively, with each of said radial portions having thereon respectively, gear teeth 114, 116, 118, and 120. Gear teeth 114 mesh with gear teeth 116 to cause shaft 88 to rotate in response to rotative movement of shaft 86, and gear teeth 118 mesh with gear teeth 120, to cause shaft 92 to rotate in response to rotative movement of shaft 90. Thus, the four clamping arms secured on shafts 86 and 88 rotate in unison, and the four clamping arms secured on shafts 90 and 92 rotate in unison.

The clamping members of this pipe-working device are arranged to work interrelatedly as shown clearly in FIG. 3. A driving shaft 122 is arranged to rotate within journals 124 and 126 and secured to each end thereof universal joints 128 and 130. A left-hand feed screw 132 is secured to universal joint 128 by any suitable manner, as by a pin 133, and has a portion moveable bearably in journal 134 integral with frame 135 and further has a cranking arm 136 secured to an extended portion 138 thereof. A threaded member 140 has internal threads engaging the threads of left-hand feed screw 132 and further has pins 142 and 143 thereon to move slidably in slots 144 and 145 of yoke member 146 secured to extension 148 of arm 78 by suitable machine bolts 150. Similarly, a right-hand feed screw 152 has one end secured to universal joint 130 by any suitable manner, as by a pin 153, and has a portion moveable bearably in journal 154 integral with frame 155. Frames 135 and 155 are secured to frame 16. A threaded member 156 has internal threads engaging the threads of right-hand feed screw 152 and includes a pin 158 and another pin, (not shown), (similar to pin 143), both of which move slidably in slot 160 and another slot, (not shown), (similar to slot 145), of yoke member 162 secured to extension 164 of arm 82 by means of machine bolts 166. Thus, turning of crank handle 136 causes rotation of left-hand feed screw 132 and right-hand feed screw 152 by reason of their interconnection through the universal joints and driving shaft to cause movement of members 140 and 156 along the feed screw members with consequent slidable movement of pins 142 and 158 in the slots of yoke members 146 and 162 so that clamping arms 78 and 82 are moved arcuately, and by further engagement of gear teeth 114, 116, 118, and 120, all of the clamping arms are moved simultaneously to contact the surface of pipe section 12 and position the pipe-working device concentrically on the pipe section. It is contemplated that left-hand screw 132, driving shaft 122, and right-hand screw 152 could also be rotated by power means as by being connected to an electric or hydraulic motor.

One means of adjustment of the operative members of this pipe-working device are described in FIG. 7. Each of the threaded members 140 and 156 include the adjustment means described by FIG. 7. Thus, threaded member 140 has internal threads 168 which cooperate with external threads 170 of adjustment member 172 which further has internal threads 174 which cooperate with threads 176 on left-hand feed screw 132. Adjustment member 172 includes an under cut portion 178 against which a conventional Allen screw 180, received threadably in threaded bore 182, may be positioned. A similar adjustment means is incorporated into threaded member 156 on right-hand screw 152. To bring about this fine adjustment, Allen screw 180 and a similar Allen screw in threaded member 156 are loosened, a suitable spanner wrench is inserted in recesses 184 and similar recesses in a like adjustment member in threaded member 156 so that adjustment member 172 and the like adjustment member in threaded member 156 may be moved in relation to screw members 132 or 152 and threaded members 140 or 156, as necessary. Then, after the threaded members 140 and 156 have been adjusted as desired to secure the proper suitable fine adjustment, Allen screw 180 operating within member 140 and the similar Allen screw within member 156 are tightened to secure this proper fine adjustment. Thus, a fine adjustment is provided for adjusting member 140 in relation to threaded member 132 or member 156 in relation to threaded member 152.

As shown in FIG. 1, ring portions 20 and 22 are provided with grooves 186 and 188 respectively, which provide means to guide a driving wheel 190 having a peripheral surface of resilient material 192 along the lower surface of grooves 186 and 188 which, as in FIG. 1, may have knurled surfaces 194 and 196, respectively, in order to have one means of a friction drive for ring member 18. Resilient material 192 may be of rubber, Nylon, Teflon, or other similar material which is slightly resilient in order to provide a non-slipping driving means for the ring member. It is preferable to have a resilient surface rather than the cooperation of two hard metallic surfaces on ring member 18 and driving wheel 190, although metallic peripheries of ring 18 and wheel 190 could be utilized.

Driving wheel 190 is positioned on shaft 198 which is gearably connected to transmission assembly 200 which is further driven by rotation of shaft 202 and hand crank 204. Transmission assembly 200 may be of conventional design and may be of a suitable gear ratio between shaft 202 and 198 as may be most suitable for the particular purpose of the working device. It is also contemplated that shaft 202 may be operably connected to a proper electric or hydraulic motor to provide the driving force. Transmission assembly 200 is secured to support frame 206 which is attached to frame member 16. Thus, the driving force applied to driving wheel 190 permits rotation of ring member 18 around the pipe section to which the pipe-working device is clamped.

As shown in FIGS. 1 and 2, an adjustable tool support frame is attachable to ring member 18 and includes a support frame 208 having slots 210 therein which receive set screws 212 which are further received threadably in first ring portion 20. Attached to support frame 208 is a bar 214 upon which is adjustably positionable working tool clamp 216 which may be positioned longitudinally of bar 214 and secured angularly thereof by tightening of set screw 218 in clamp 216. FIG. 1 shows a conventional cutting torch held in position on clamp 216 although, as stated above, other types of working tools may be used.

FIG. 4 shows an alternate embodiment of a pipe working device according to this invention. In this embodiment a different means of driving ring assembly 18 is described. Instead of knurled surfaces 194 and 196 in grooves 186 and 188, a chain member 220 is positioned in groove 186 and a similar chain member 222 is positioned in groove 188. Chain member 220 is held in position by pin 224 passing through an end link of chain 220 and through bore 226 adjacent the extremity of ring portion 20. Chain 222 is held in position on ring portion 22 by means of pin 228 passing through an end link of chain 222 and further passing through bore 230 in ring portion 22. Similar means of fastening the chain members are provided for the other ends of chains 220 and 222. A sprocket 232 is secured to shaft 198 and has teeth 234 which engage the links of chains 220 and 222 to provide the driving means for ring member 18 of this embodiment. Chains 220 and 222 are so positioned on ring portions 20 and 22 that no lost motion occurs in the engaging of sprocket teeth 234 as they engage successively the individual chain portions 220 and 222.

In operation, threaded bolt member 60 is unscrewed to release second ring portion 22 from its position adjacent first ring portion 20, and therefore the ring assembly 18 is opened and the pipe-working device is positioned transversely of a pipe section with clamping arms 70, 72, 74, 76, 78, 80, 82, and 84 initially outwardly rotated so that the pipe section may pass therebetween. Then, second ring portion 22 is brought into position adjacent ring portion 20 and threaded bolt member 60 is tightened securely. Thus, a continuous smooth track or guiding surface is provided for the working tool which can be subsequently positioned on bar 214. With a pipe section brought between the clamping arms, crank handle 136 is rotated causing clamping arms 70, 72, 74, 76, 78, 80, 82, and 84 to approach the pipe section and ultimately to contact the pipe section and clamp thereon securely. Because of the precise adjustment capabilities of this working device, as the device is clamped on the pipe section, the pipe section is securely held concentrically in regard to the circumference of ring assembly 18. A working tool, such as cutting torch 14, may then be positioned adjustably as desired in tool clamp 216. Operation of hand crank 204 then causes rotation of driving wheel 190, and consequently rotation of ring member 18 with cutting torch 14 adjusted accurately, around the pipe section in a concentric manner.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A pipe-working machine comprising:
   a circular frame,
   an openable ring assembly rotatable on said frame,
   self-centering clamp means attached to said frame, said clamp means including a pair of clamp members linkably connected thru a universal joint, and said clamp means clampable to a pipe section to be worked,
   tool support means connected to said ring assembly, and,
   driving means for rotating said ring assembly on said frame.

2. A pipe-working machine as described in claim 1, wherein:
   said clamp means includes a first pair of clamp members on a first side of said frame and a second pair of clamp members on a second side of said frame, and said first and second pair of clamp members are operably interconnected.

3. A pipe-working machine as described in claim 1, wherein:
   at least one of said clamp members includes a pair of clamping arms gearably connected together for clamping operation in cooperation with the other one of said clamp members.

4. A pipe-working machine as described in claim 3, wherein:
   at least one of said clamp members includes means for drivable connection to said universal joint thru a screw member.

5. A pipe-working machine as described in claim 4, wherein:
   said universal joint is connected to a rotatable driving member.

6. A pipe-working machine as described in claim 5, wherein:
   said openable ring assembly is in tongue and groove relationship with the periphery of said frame and includes means to lock said ring assembly on said frame.

7. A pipe-working machine as described in claim 6, wherein:
   said clamp means includes a first pair of clamp members on a first side of said frame and a second pair of clamp members on a second side of said frame, and said first and said second pair of clamp members are operably interconnected.

8. A pipe-working machine as described in claim 7, wherein:
   said first pair of clamp members includes a first pair of clamping arms, said second pair of clamp members includes a second pair of clamping arms, and said first and second pairs of clamping arms are in juxtaposition on said first and second sides of said frame and are operably interconnected.

9. A pipe-working machine as described in claim 8, wherein:
   said openable ring assembly includes a chain-like member secured to the periphery thereof, and
   said driving means includes a gear assembly positioned on said frame and said gear assembly further includes a sprocket cooperating with said chain-like member to drive said ring assembly.

10. A pipe-working machine as described in claim 8, wherein:
    said openable ring assembly is knurled around the periphery thereof, and
    said driving means includes a gear assembly positioned on said frame and said gear assembly further includes a wheel having a peripheral surface of resilient material positionable in driving contact with said ring assembly.

11. A pipe-working machine as described in claim 6, wherein:
    said openable ring assembly includes a chain-like member secured to the periphery thereof, and
    said driving means includes a gear assembly positioned on said frame and said gear assembly further includes a sprocket cooperating with said chain-like member to drive said ring assembly.

12. A pipe-working machine as described in claim 6, wherein:
    said openable ring assembly in knurled around the periphery thereof, and
    said driving means includes a gear assembly positioned on said frame and said gear assembly further includes a wheel having a peripheral surface of resilient material positionable in driving contact with said ring assembly.

13. A pipe-working machine as described in claim 1, wherein:
    said openable ring has a peripheral surface of resilient material, and said driving means includes a gear assembly positioned on said frame and said gear assembly further includes a wheel having a knurled peripheral surface positionable in driving contact with said ring.

14. A pipe-working machine as described in claim 6, wherein:
said openable ring has a peripheral surface of resilient material, and
said driving means includes a gear assembly positioned on said frame and said gear assembly further includes a wheel having a knurled peripheral surface positionable in driving contact with said ring.

15. A pipe-working machine as described in claim 8, wherein:
said openable ring has a peripheral surface of resilient material, and
said driving means includes a gear assembly positioned on said frame and said gear assembly further includes a wheel having a knurled peripheral surface positionable in driving contact with said ring.

16. In a pipe-working machine having a circular frame, and openable ring on said frame, means to clamp said machine to a pipe section, said means including universal joint means; tool support means, and driving means for rotating said ring on said frame, the improvement wherein said openable ring is knurled around the periphery thereof, and said driving means includes a wheel having a peripheral surface of resilient material positionable in driving contact with said ring.

17. In a pipe-working machine having a circular frame, an openable ring on said frame, means to clamp said machine to a pipe section, said means including universal joint means; tool support means, and driving means for rotating said ring on said frame, the improvement wherein said openable ring has a peripheral surface of resilient material, and said driving means includes a wheel having a knurled peripheral surface positionable in driving contact with said ring.

* * * * *